March 19, 1935.  F. R. POTTS  1,995,223
THREE-SPEED MOWER
Filed Aug. 13, 1934   4 Sheets-Sheet 1

Fisher R. Potts
Inventor

By C. A. Snow & Co.
Attorneys.

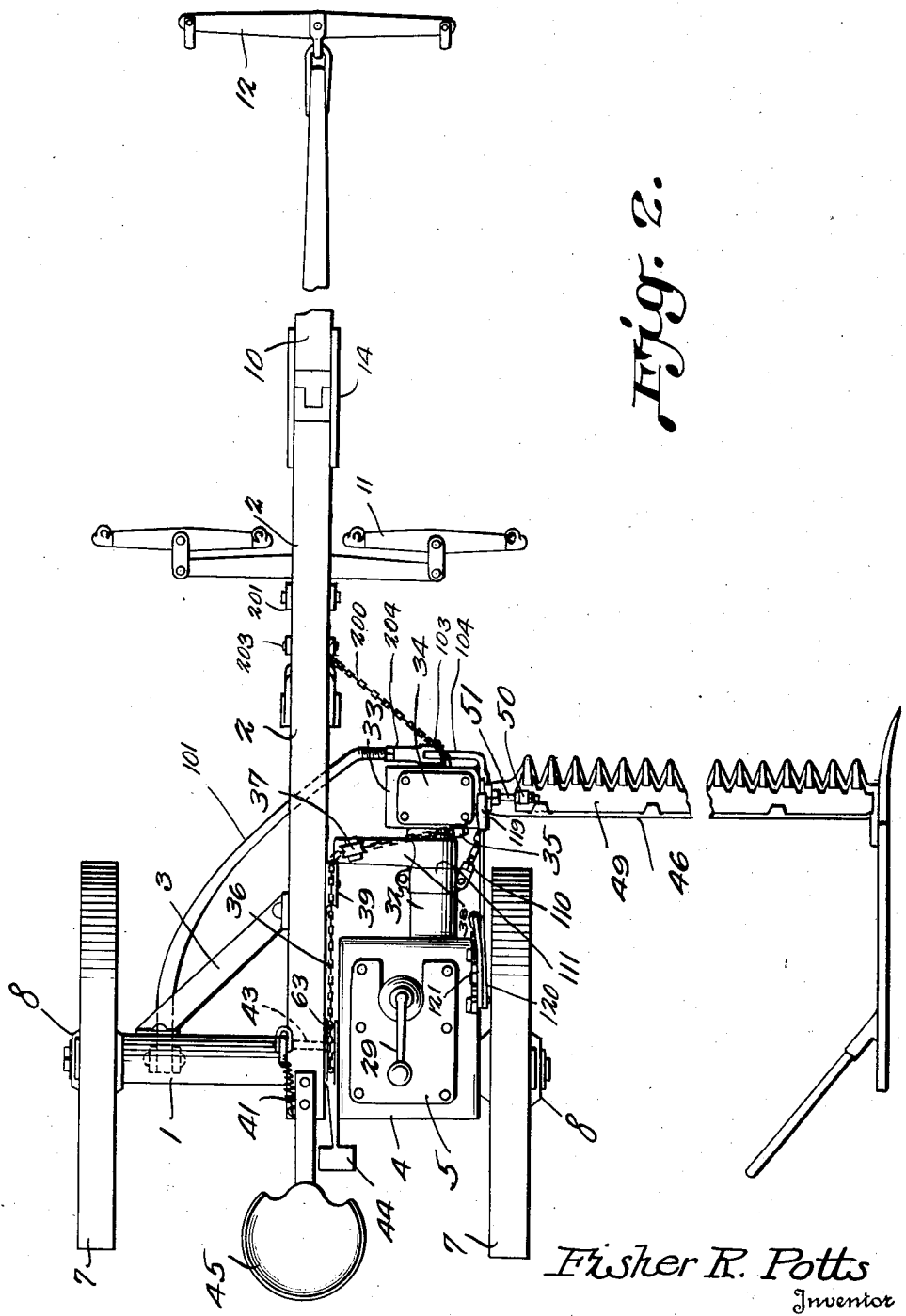

March 19, 1935.  F. R. POTTS  1,995,223
THREE-SPEED MOWER
Filed Aug. 13, 1934  4 Sheets-Sheet 3
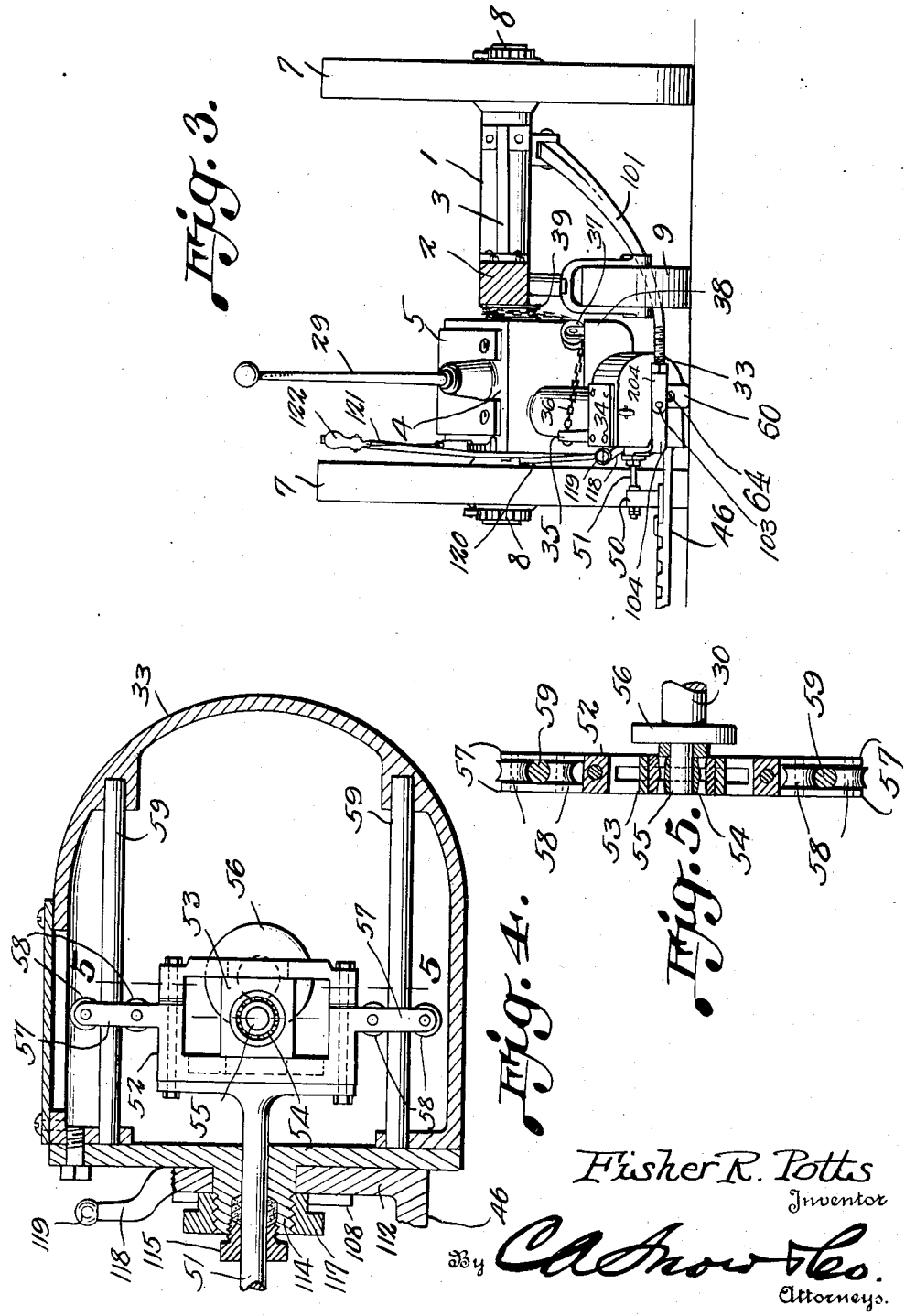
Fisher R. Potts
Inventor
By CA Snow & Co.
Attorneys.

March 19, 1935.  F. R. POTTS  1,995,223
THREE-SPEED MOWER
Filed Aug. 13, 1934  4 Sheets-Sheet 4
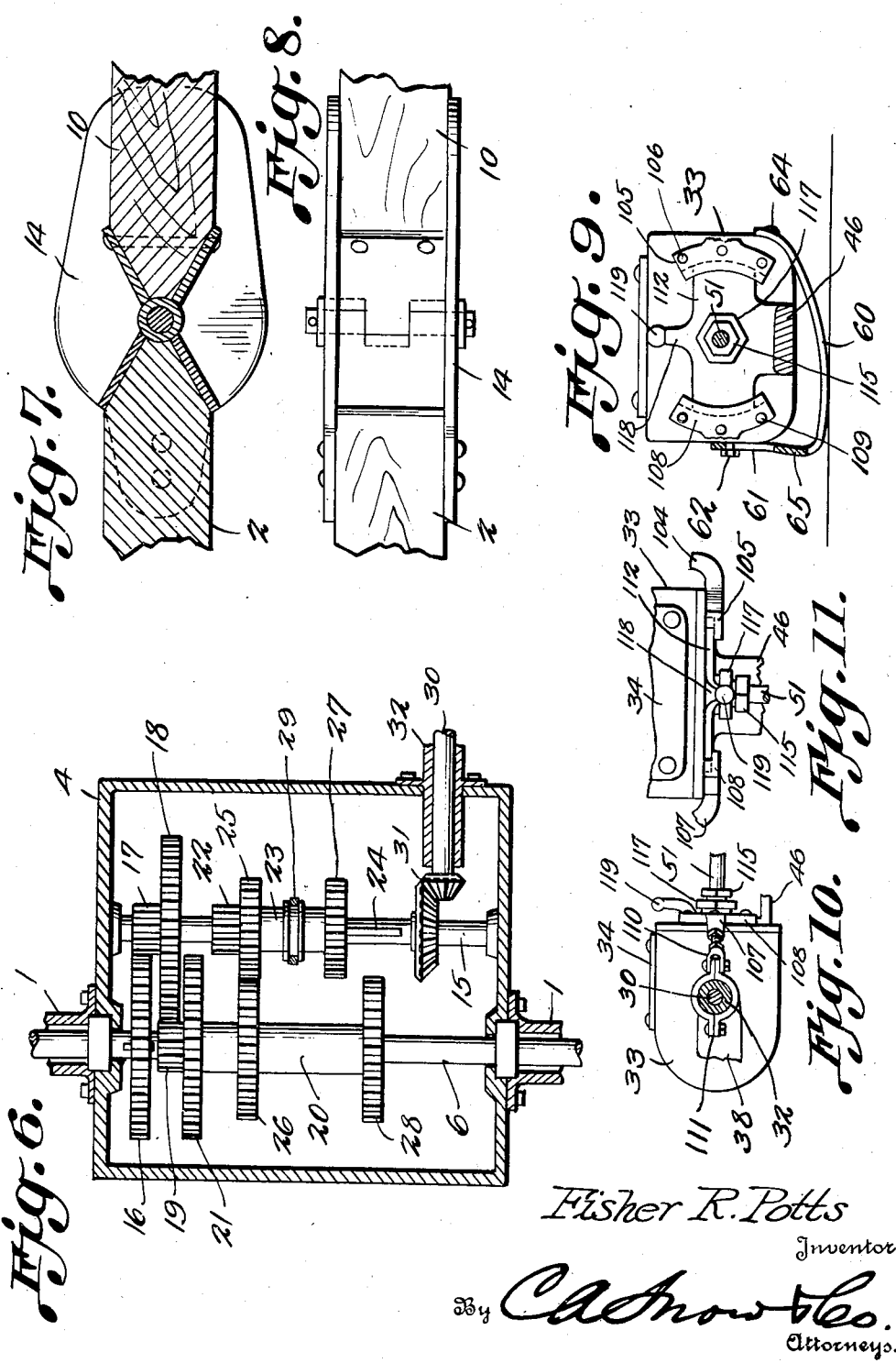
Fisher R. Potts
Inventor Patented Mar. 19, 1935

1,995,223

UNITED STATES PATENT OFFICE 1,995,223

THREE SPEED MOWER

Fisher R. Potts, Bolckow, Mo.

Application August 13, 1934, Serial No. 739,650

4 Claims. (Cl. 56—272)

One object of this invention is to provide a mower which can be operated at different speeds, and another object of the invention is to provide novel means for raising and lowering the cutter bar both by swinging it up and down and by rocking it on a longitudinal axis.

A further object of the invention is to provide novel means for actuating the cutter bar.

It is within the province of the disclosure to improve generally, and to enhance the utility of devices of that type to which the present invention appertains.

With the above and other objects in view which will appear as the description proceeds, the invention resides in the combination and arrangement of parts and in the details of construction hereinafter described and claimed, it being understood that changes may be made in the precise embodiment of the invention herein disclosed, within the scope of what is claimed without departing from the spirit of the invention.

In the accompanying drawings:

Figure 2 is a top plan wherein parts are broken away;

Figure 3 is a transverse section, looking backwardly toward the ground wheels;

Figure 4 is a section taken through one of the casings;

Figure 5 is a section on the line 5—5 of Figure 4;

Figure 6 is a section through the gear casing;

Figure 7 is a longitudinal section showing a portion of the tongue;

Figure 8 is a plan of the structure shown in Figure 7;

Figure 9 is a side elevation of the casing;

Figure 10 is a rear elevation of the casing;

Figure 11 is a top plan of the structure shown in Figure 10.

Figure 1:
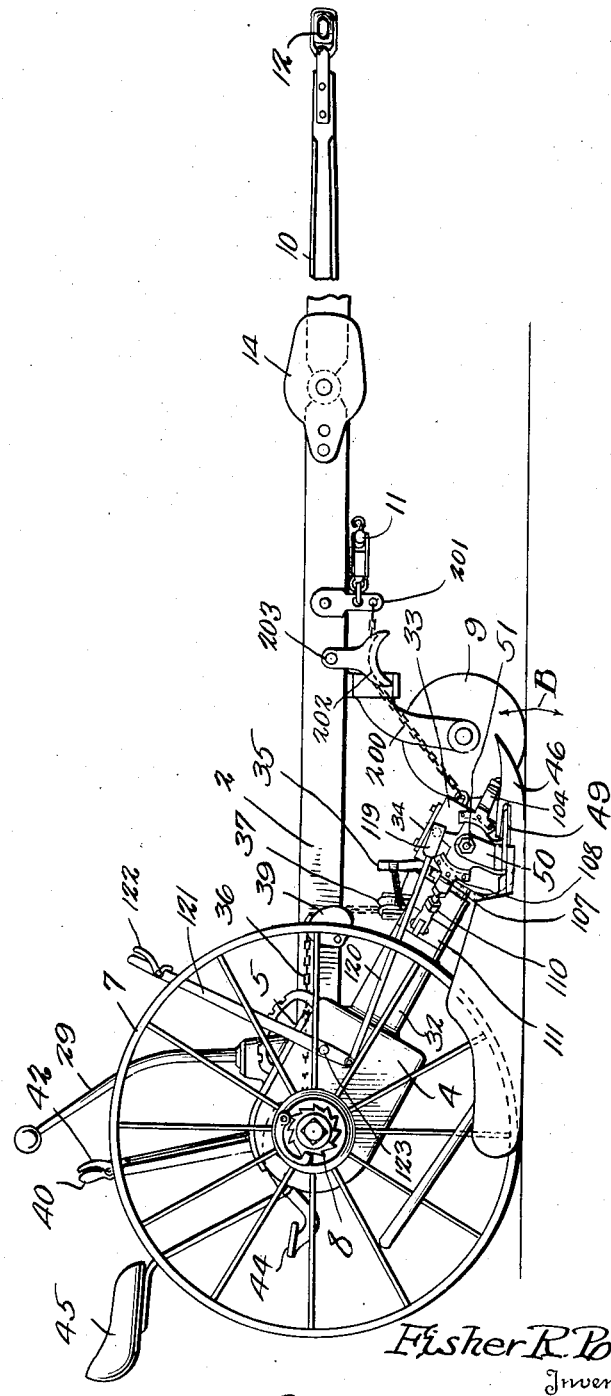
Figure 1 is a side elevation showing a device constructed in accordance with the invention.

The device forming the subject matter of this application comprises a frame, including an axle housing 1 to which a rear tongue 2 is attached, the rear tongue being sustained from the housing 1 by a brace 3. The double tree is shown at 11, is connected to a radius arm 201 mounted to swing on the rear tongue 2. A flexible element 200 (chain) is connected to the radius arm 201, and extends backwardly and laterally over an arcuate trough-shaped support 202, pivotally supported at 203 on the tongue 2. The rear end of the flexible element 202 is connected to the casing 33, hereinafter described. The pull of the draft thus is divided between the casing 33 and the tongue 2. The support 202 aids in the operation of the draft rigging, when the machine is passing over uneven ground, and by it the flexible element 200 is held up, and out of the way of the castor wheel 9. A gear casing 4 is interposed in the axle housing 1 and carries an inspection plate 5.

An axle 6 is supported for rotation in the axle housing 1 and in the gear casing 4, as shown in Figure 6. Ground wheels 7 are connected by pawl and ratchet mechanisms 8, (Figure 1) to the axle 6. The afore-mentioned castor wheel 9 is mounted on the rear tongue 2 in advance of the gear casing 4, to rotate upon a horizontal axis and to swing laterally. The castor wheel 9 takes the weight off the draft animals.

A front tongue is shown at 10 and carries a neck yoke 12. A hinge 14 connects the rear end of the front tongue 10 with the forward end of the rear tongue 2, the hinge 14 being so constructed that, although the front tongue can swing vertically, it has no sidewise movement. The hinge 14 is elongated to promote strength, and it permits the front tongue 10 to swing vertically and accommodate itself to the convenience of the draft animals, but since the hinge 14 is not horizontally flexible, the front tongue 10 becomes effective, under the efforts of the draft animals, to steer the implement and to turn it about, from side to side, on the ground wheels 7.

Figure 6 shows that a counter-shaft 15 is journaled for rotation in the gear casing 4, in parallel relation to the axle 6. A gear wheel 16 is secured to the axle 6. The gear wheel 16 meshes with a pinion 17, mounted to turn on the counter-shaft 15. A gear wheel 18 is mounted to turn on the counter-shaft 15, and is connected to the pinion 17, to rotate therewith. The gear wheel 18 meshes with a pinion 19 on one end of a sleeve 20, which is journaled for rotation on the axle 6.

A gear wheel 21 is secured to the sleeve 20. The gear wheel 21 is adapted to mesh with a pinion 22 secured to a collar 23 splined at 24 upon the counter-shaft 15 to slide longitudinally of the counter-shaft and to rotate therewith. A pinion 25 is secured to the collar 23 and is adapted to mesh with a gear wheel 26 secured to the sleeve 20. The sleeve 20 carries a pinion 28 adapted to mesh with a gear wheel 27 secured to the collar 23. The collar 23 is moved endwise on the shaft 15 through the instrumentality of a shift lever 29 carried by the gear casing 4.

An operating shaft 30 is located at right angles to the counter-shaft 15, in front of the counter-shaft, and is connected by beveled pinions 31 with the counter-shaft. The operating shaft 30 projects forwardly and is journaled in a tubular extension 32 on the forward portion of the gear casing 4.

The shaft 30 extends into a casing 33. The casing 33 is mounted to rock for adjustment, transversely of the draft line of the implement, and more specifically, to rock for adjustment about an axis represented by the shaft 30. The reason for this rocking adjustment of the casing 33 is in order that the cutting mechanism (represented for present purposes by the part 46 of Figure 3) may be swung upwardly from the horizontal position of Figure 3 to a vertical position.

The rear end of a brace 101 is pivoted to the axle housing 1, and the forward end of the brace carries an adjustable connection 204 which is pivoted at 103 upon an angle bracket 104 which is provided at its rear end with an arcuate guide 105 (Figure 9), secured at 106 to the casing 33. The pivot element shown at 103 in Figure 3 is in line with the shaft 30. The numeral 107 marks a bracket provided at its front end with an arcuate guide 108 secured at 109 (Figure 9) to the casing 33, in opposed, cooperating relation to the guide 105. The hind end of the bracket 107 is united by a longitudinally adjustable, rigid connection 110 with a supporting ring 111, mounted for rocking movement on the tubular extension 32 of the gear casing 4. The position of the casing 33, to line it up properly on the shaft 30, can be adjusted by lengthening and shortening the connections 204 and 110, and after the casing 33 has been positioned properly, it can rock transversely of the draft line, at the will of an operator, because the ring 111 can turn on the extension 32 of the gear housing 4, and because the pivot element 103 of Figure 3 is in line with the shaft 30.

The casing 33 carries a removable inspection plate 34. The casing 33 is disclosed in detail in Figure 4, and Figure 3 shows that the casing has an upstanding bracket 35, to which is secured a flexible element or chain 36 extended transversely of the draft line, and upwardly around a sheave 37 mounted for rotation on a lateral arm 38 carried by the extension 32 of the gear casing 4. The flexible element 36 is secured to an eccentric 39, mounted on the rear tongue 2 to rock parallel to the draft line. The rear end of the flexible element 36 is connected to a pulley 63 carrying a pedal 44. The pulley 63 is secured to a shaft 43 mounted to rock in the rear tongue 2. A hand lever 40 (Figure 1) is secured to the shaft 43, and the hand lever has a latch mechanism 42 which holds it in adjusted position. Backward movement of the hand lever 40 is assisted by a pull spring 41 (Figure 2) connected to the hand lever and to the rear tongue 2. The pedal 44 and the hand lever 40 are in accessible relation to a driver's seat 45, which is mounted on the rear tongue 2.

The numeral 46 (Figures 2 and 3) designates a guard which extends laterally from the casing 33, at right angles to the draft line. On its inner end (Figures 4 and 9) the guard 46 has an upstanding head 112, the ends of which move between the guides 108—105 and the adjacent wall of the casing 33. A cutter bar 49 is mounted for right line reciprocation on the guard 46. At its inner end, the cutter bar 49 has an upstanding arm 50 (Figure 3) adjustably connected to a slide rod 51 mounted for longitudinal reciprocation in a tubular bearing 114 (Figure 4) on the casing 33, the bearing 114 being provided with a gland 115 disposed about the slide rod 51. The head 112 of the guard 46 can swing for adjustment on the bearing 114, about an axis represented by the rod 51. The head 112 of the guard 46 is held on the bearing 114, for swinging adjustment, by a nut 117, or equivalent means.

The head 112 has an upstanding arm 118, to be seen in Figures 4 and 9, and this arm is connected by a ball and socket joint 119 to a pitman 120 pivoted to the lower end of a lever 121 carrying a latch mechanism 122, whereby the lever may be held in adjusted positions, the lever being fulcrumed at 123, intermediate its ends, on the side of the gear casing 4.

Figure 4 shows that a separable cross head 52 is attached to the inner end of the slide rod 51, within the casing 33. A slide 53 is mounted for reciprocation in an opening in the cross head 52 and is connected by an anti-friction bearing 54 with a wrist pin 55 on a crank disk 56, carried, within the casing 33, by the forward end of the shaft 30. The cross head 52 has outstanding fingers 57 between which are journaled anti-friction wheels 58 located on opposite sides of tracks 59 carried by the casing 33.

Through the instrumentality of the lever 121, the pitman 120, and the arm 118 of Figure 9, the head 112 on the inner end of the guard 46, the guard can be tilted transversely of its length, in the direction indicated by the arrow B in Figure 1, so as to raise and lower the teeth of the cutter bar 49 and the teeth of the guard 46, with respect to the surface of the ground.

The drives are as follows, reference being had to Figures 1 and 6:

Rotation is imparted to the axle 6 from the ground wheels 7, by way of the pawl and ratchet devices 8 of Figure 1. In Figure 6, the mechanism is set to drive at intermediate speed. Under such circumstances, the gear wheel 16 turns with the axle 6, and rotates the pinion 17, the gear wheel 18 rotating with the pinion 17 on the shaft 15. The pinion 19, meshing with the gear wheel 18, rotates the sleeve 20 on the axle 6, the gear wheel 26 meshing with the pinion 25 to rotate the collar 23, rotation being imparted to the shaft 15, because the collar 23 is splined at 24 to the shaft 15.

From the shaft 15, rotation is imparted to the operating shaft 30 by way of the beveled pinions 31.

By means of the shift lever 29, the collar 23 may be moved endwise, to bring the pinion 22 on the collar 23 into mesh with the gear wheel 21 on the sleeve 20, the pinion 25 moving out of mesh with the gear wheel 26. Then a high speed drive is imparted to the counter-shaft 15, and consequently to the operating shaft 30.

For low speed, the collar 23 is moved, through the instrumentality of the shift lever 29, until the pinion 25 is out of mesh with the pinion 26, the gear wheel 27 being brought into mesh with the pinion 28. Then, a low speed rotation is imparted to the counter-shaft 15, and to the operating shaft 30.

When the operating shaft 30 is rotated, at high speed, at intermediate speed or at low speed, the crank disk 56 on the forward end of the operating shaft 30 carries the wrist pin 55 around in an orbit, and right line reciprocation is imparted to the rod 51, through the instrumentality of the slide 53 and the cross head 52 of Figure 4. The slide rod 51, shown in Figure 3, imparts right line reciprocation to the cutter bar 49, by way of the arm 50 on the cutter bar, the cutter bar reciprocating on the guard 46. When it is desired to stop the operation of the cutter bar 49, the shift lever 29 may be brought into play, so that the gear wheels (Figure 6) on the collar 23 are not in mesh with the corresponding gear wheels on the sleeve 20. Then no rotation will be imparted from the sleeve 20 to the collar 23 and to the counter-shaft 15.

The operator can manipulate the hand lever 40, or operate the pedal 44, to rock the shack 43, the pulley 63 actuating the flexible element 36, to raise or lower the guard 46 and the cutter bar 49. The machine may be operated with the cutter bar not only in a horizontal position, but in a vertical position, as well, and the machine is useful not only for cutting on the level, but also for cutting along an inclined bank, on the sides of a hedge, and in many other places which will suggest themselves readily to the user. It will also mow down over the side of a bank.

The device is simple in construction, but it embodies a means whereby a cutter bar may be reciprocated at different speeds, depending upon the work at hand. The casing 33, the guard 46, and the cutter bar 49 may be caused to rock for adjustment with the shaft 30 as an axis of turning movement, and in this way, the cutter bar may be arranged at different angles with respect to the horizontal and to the vertical, thereby accommodating the cutter bar to the slope of the surface to be cut over. The device will be found to be easy upon animals, and will operate efficiently, without creating heavy draft.

Figures 3 and 9 show that a shoe 60, in the form of a strip possessing some resiliency, is mounted on the casing 33, to engage the ground, the forward end of the shoe 60 being secured to 64 to the casing 33, the shoe having an upstanding rear end 65 in which there is a slot 61. A securing element 62 passes through the slot 61 and clamps the end 65 of the shoe 60 adjustably to the casing 33.

Having thus described the invention, what is claimed is:

1. In a device of the class described, an axle, a ground wheel connected to the axle and constituting means for rotating the axle, a casing mounted on the axle, an operating shaft journaled in the casing, speed-change mechanism in the casing and under the control of an operator, the speed-change mechanism connecting the axle with the operating shaft, a guiding means mounted to turn for adjustment on the operating shaft, a cross head slidable in the guiding means, a slide mounted to reciprocate in the cross head, means for actuating the slide from the operating shaft to reciprocate the slide, a cutter bar carried by the guiding means for reciprocation, means for connecting the cutter bar with the slide to secure a reciprocation of the cutter bar, and means under the control of an operator for turning the guiding means on the operating shaft to raise and lower the cutter bar transversely of the draft line.

2. In a device of the class described, an axle, a ground wheel connected to the axle and constituting means for rotating the axle, a casing mounted on the axle, an operating shaft journaled in the casing, mechanism in the casing for operatively connecting the axle with the operating shaft, a guiding means mounted to turn for adjustment on the operating shaft, a cross head slidable in the guiding means, a slide mounted to reciprocate in the cross head, means for actuating the slide from the operating shaft to reciprocate the slide, a cutter bar carried by the guiding means for reciprocation, means for connecting the cutter bar with the slide to secure a reciprocation of the cutter bar, and means under the control of an operator for turning the guiding means on the operating shaft to raise and lower the cutter bar transversely of the draft line.

3. In a device of the class described, an axle, a ground wheel connected to the axle and constituting means for rotating the axle, a casing mounted on the axle, an operating shaft journaled in the casing, speed-change mechanism in the casing and under the control of an operator, the speed-change mechanism connecting the axle with the operating shaft, a guiding means mounted to turn for adjustment on the operating shaft, a cross head slidable on the guiding means, a slide mounted to reciprocate on the cross head, a crank disk carried by the operating shaft, a wrist pin on the crank disk and journaled in the slide, a cutter bar carried by the guiding means for reciprocation, means for connecting the cutter bar with the slide to secure reciprocation of the cutter bar, and means under the control of an operator for turning the guiding means on the operating shaft to raise and lower the cutter bar transversely of the draft line.

4. In a device of the class described, a wheel-mounted vehicle including an operating shaft, a casing, means for mounting the casing to swing for adjustment with the operating shaft as an axis of swinging movement, a guard, means for mounting the guard for rocking movement on the casing, to raise and lower the forward edge of the guard, means for imparting rocking movement to the guard at the will of an operator, a cutter bar slidable on the guard, a cross head slidable in the casing, means for connecting the cross head operatively to the cutter bar, a slide mounted to reciprocate on the cross head, a crank disk carried by the operating shaft, and a wrist pin on the crank disk, the wrist pin being journaled in the slide.

FISHER R. POTTS.